(12) United States Patent
Griffin

(10) Patent No.: US 7,699,535 B2
(45) Date of Patent: Apr. 20, 2010

(54) HIGH ENERGY FIBER TERMINATIONS AND METHODS

(75) Inventor: Stephen E. Griffin, Glendale, AZ (US)

(73) Assignee: InnovaQuartz Inc., Minnetonka, MN (US)

( * ) Notice: Subject to any disclaimer, the term of this patent is extended or adjusted under 35 U.S.C. 154(b) by 300 days.

(21) Appl. No.: 12/002,464

(22) Filed: Dec. 17, 2007

(65) Prior Publication Data

US 2008/0107382 A1  May 8, 2008

Related U.S. Application Data

(62) Division of application No. 11/063,458, filed on Feb. 22, 2005, now Pat. No. 7,309,167.

(51) Int. Cl.
*G02B 6/36* (2006.01)

(52) U.S. Cl. ............... 385/78; 385/60; 385/66; 385/72; 385/84; 385/137

(58) Field of Classification Search ............ None
See application file for complete search history.

(56) References Cited

U.S. PATENT DOCUMENTS

| 4,185,883 A | 1/1980 | Chown et al. |
| 4,440,471 A * | 4/1984 | Knowles ............ 385/83 |
| 6,282,349 B1 | 8/2001 | Griffin |
| 7,195,400 B2 * | 3/2007 | Asano et al. ........ 385/78 |
| 2002/0110332 A1 | 8/2002 | Clarkin et al. |

* cited by examiner

*Primary Examiner*—Michelle R Connelly Cushwa
(74) *Attorney, Agent, or Firm*—Jose' W. Jimenez; Kimberly K. Baxter; Gregory L. Koeller

(57) ABSTRACT

A ferrule and method are presented that fuses optical fibers, capillaries and the like to ferrules while reducing deformation of the fused component and the ferrule and minimizing stresses within the assembly. Reduced deformation and stress is accomplished by providing high contact angles in a symmetrical, short section of fusion in fusing the component carried by the ferrule to the ferrule. It is particularly applicable to hermetic terminations of polymer clad fiber optics where irregular glass fusion joints cause irregular light leakage at the fiber launch but benefits are significant when used for other fiber and capillary architectures as well.

25 Claims, 4 Drawing Sheets

PRIOR ART

HIGH ENERGY FIBER TERMINATIONS AND METHODS

This application is a Divisional of application Ser. No. 11/063,458 filed on Feb. 22, 2005, which issued on Dec. 18, 2007 as U.S. Pat. No. 7,309,167.

FIELD OF THE INVENTION

This invention relates generally to applications of silica core optical fiber in delivery of energy pulses or sustained power in surgery, welding and ordinance ignition as well as hermetic ferrule terminations of doped core fiber such as that used in telecommunications. The principles outlined herein may also apply to non-surgical applications, particularly where hermetic seals are desired in telecommunications and sensing applications of optical fiber for compliance with Telcordia standards, military specifications or other standards or in environments where hermetic seals are beneficial, e.g. "down hole" sensors for the oil industry.

BACKGROUND OF THE INVENTION

U.S. Pat. No. 4,185,883 (Chown et al.) discloses an optical fiber coupling element that includes a glass sleeve secured to a length of optical fiber. The optical fiber is placed in the glass sleeve, and the sleeve is heated so that it collapses around the fiber to hold the fiber in place.

U.S. Pat. App. No. 20020110332 (Clarkin et al.) discloses a ferrule presenting a preferentially "softenable" substance within the bore for reducing fusion temperatures and thus reducing distortion of the ferrule and element fused within.

U.S. Pat. No. 6,282,349 (Griffin) discloses a fiber fused in a ferrule.

It is often desirable to employ a ferrule in joining optical components together or when incorporating optical components into other devices. A ferrule is a piece of material (glass, ceramic, polymer, metal or composite) having one or more holes into which components such as optical fibers or capillaries may be inserted, offering added support to the fiber/capillary as well as increased structural strength and facilitate alignment of the fiber/capillary with another, similarly terminated component.

In most cases, adhesives secure components carried within ferrules but adhesives can be problematic in many applications due to the difference in chemical and physical properties of the adhesives with respect to the fiber and ferrule. Adhesive terminated fibers in ferrules are not truly hermetic and are labile to elevated temperatures and certain chemicals. In some applications, it is desirable to provide a fiber-in-ferrule (or capillary-in-ferrule) that may be immersed within solutions of extreme pH, solvents that degrade adhesives, vacuum or elevated pressure and temperature environs. In many, more routine applications it is desirable to provide a seal to prevent migration of gasses or other contamination from the environment into a package intended to isolate an active device, e.g., a semiconductor laser. A ferrule may also act to redirect overfill energy in fibers used in a high power coupling application such as a industrial welding and medical laser delivery systems. Where a fiber must pass through a bulkhead, e.g., from a monitor to within a chemical reaction process stream, chemical and thermal resistance may be critical in maintaining the system seal.

In all cases, it is important to minimize stress induced by thermal expansion mismatches between the ferrule, the carried optical fiber or capillary element and any other materials (polymer adhesives, solders, etc.). The stresses generated by thermal expansion mismatch can degrade optical and mechanical performance of the overall package. By directly fusing fiber or capillary within ferrules made of like material, thermal expansion mismatch stresses are eliminated. Residual physical stresses and strains do remain in traditional packages, however, due to the extremely low contact angles in the fusion region. As is generally known in the scientific glassblowing community, low contact angles in welds are extremely susceptible to failure due to these residual stress concentrations. While post-fusion annealing can reduce the stresses in the weld, considerable stress generally remains and, in the case of fiber and capillary terminations, true post-fusion annealing is rarely possible due to the local presence of thermally labile materials (fiber and capillary polymer coatings, strain relief materials, etc.).

It has been known in the art to seal fibers to ferrules by several methods including adhesives, soldering of metallized fibers and ferrules or by swaging material around the fiber. Many attempts have been made to seal terminations by fusing a fiber together with the ferrule. While generally successful in cases where fiber or capillaries are not doped or employ dopants that do not radically alter thermal properties of the glass or easily diffuse throughout the glass at elevated temperatures, attempts with doped core fiber such as that used in telecom/datacom applications and polymer clad fiber have had limited success. Seals generally fail to hold, or the fiber and/or the ferrule fails, particularly when fiber and ferrule are of differing materials, coupling efficiencies are poor where core dopants diffuse under heating and where polymer clad fibers—necessarily bare of polymer near the fusion, leak into the ferrule at points of contact therein. Where each is made substantially of similar glasses, fusing tends to distort tiny telecom fiber cores to such an extent that the fiber's optical characteristics are changed. This distortion is primarily due to asymmetric, low contact angle stresses in the fusion seal and generally lengthy and poorly reproducible fusion regions. In the case of single mode or polarization maintaining fibers, the fiber geometry is crucial to its proper operation. It is extremely difficult to maintain uniformity of stresses and dimensions during a fusing operation and, due to the small diameter of both core and cladding (and in the case of polarization maintaining fibers, the precise stress distributions within the core composite structures), such difficulty renders the practice of fusion terminations for these type fibers impractical.

Even in cases where fusion has proven viable, e.g., so-called "Specialty Fiber" (fiber for power and spectrum transmission as opposed to data) terminated within quartz and silica ferrules, the residual stress within the structure of the fiber and the ferrule, which may lead to premature failure. Moreover, in the case of providing a preferentially softenable material as an interface between a telecom-type fiber and ferrule, asymmetric stresses due to low contact angles and non-centrosymmetric, extended fusion regions remains and the potential for premature failure remains.

Finally, for lower cost, higher Numerical Aperture (NA) specialty fiber where polymer claddings are employed instead of fluorine doped silica claddings, contact between the bare glass core and the ferrule, in both fused and non-fused regions, must be kept to a reproducible minimum. While the input face may be reproducibly located in space for reproducible fusion thickness (where the nascent core dimension is lost in the fusion to the larger glass ferrule) as the fiber in free space is clad efficiently by air, additional points of contact between the bare core and glass are sites of light leakage and must be avoided. A competing requirement is that the space between the glass ferrule bore and the fiber core must be kept to a minimum in order to maintain concentricity and axial alignment of the fiber within the ferrule. The invention disclosed herein addresses these conflicting requirements, facilitating a low cost, high energy and hermetic termination for polymer clad silica fiber.

SUMMARY OF THE INVENTION

The invention claimed and described herein comprises a set of similar strategies for forming fusion junctions to silica optical fiber, silica rod and tubing and silica capillary for reinforcement, hermeticity and other applications. While high energy/power terminations of optical fiber for laser coupling are of principal interest, any application where a direct fusion of a quartz tube over another quartz tube or rod is desired will benefit from the method of executing the preferred embodiment, with or without some modification of approach, as required.

In the preferred embodiment, a ferrule wherein the constant diameter, axial bore is flared to a larger diameter at the end to be fused such that, upon fusing the fiber or capillary within the ferrule, contact angles in the weld region are high and the weld is centrosymmetric to the fused element and ferrule-to-strand fusion and is reproducibly short in length, physically centrosymmetric and low in stress.

Among the objects of the present invention are the following:

To provide a new and useful ferrule geometry for hermetic termination of optical fiber with minimal stress;

To provide a new and useful method of producing hermetically terminated optical fiber with minimal stress;

To provide a new and useful ferrule geometry for hermetic termination of optical fiber with minimal physical distortion;

To provide a new and useful method of producing hermetically terminated optical fiber with minimal physical distortion;

To provide a new and useful ferrule geometry for hermetic termination of capillary with minimal stress;

To provide a new and useful method of producing hermetically terminated capillary with minimal stress;

To provide a new and useful ferrule geometry for hermetic termination of capillary with minimal physical distortion;

To provide a new and useful method of producing hermetically terminated capillary with minimal physical distortion;

To provide a new and useful ferrule geometry for improved alignment of tapered fibers with the ferrule axis;

To provide a new and useful ferrule geometry for enabling highly efficient, hermetic ferrule, high energy terminations on polymer clad silica fiber;

To provide a generalized strategy and methodology for producing hermetic fusions in fiber, rod, capillary and tubing for minimization of residual stresses and uniformity in results.

The novel features that are considered characteristic of the invention are set forth with particularity in the appended claims. The invention itself, however, both as to its structure and its operation together with the additional objects and advantages thereof will best be understood from the following description of the preferred embodiment of the present invention. Unless specifically noted, it is intended that the words and phrases in the specification and claims be given the ordinary and accustomed meaning to those of ordinary skill in the applicable art or arts. If any other meaning is intended, the specification will specifically state that a special meaning is being applied to a word or phrase. Likewise, the use of the words "function" or "means" in the Description of Preferred Embodiments of the invention is not intended to indicate a desire to invoke the special provision of 35 U.S.C. §112, paragraph 6 to define the invention. To the contrary, if the provisions of 35 U.S.C. §112, paragraph 6, are sought to be invoked to define the invention(s), the claims will specifically state the phrases "means for" or "step for" and a function, without also reciting in such phrases any structure, material, or act in support of the function. Even when the claims recite a "means for" or "step for" performing a function, if they also recite any structure, material or acts in support of that means of step, then the intention is not to invoke the provisions of 35 U.S.C. §112, paragraph 6. Moreover, even if the provisions of 35 U.S.C. §112, paragraph 6, are invoked to define the inventions, it is intended that the inventions not be limited only to the specific structure, material or acts that are described in the preferred embodiments, but in addition, include any and all structures, materials or acts that perform the claimed function, along with any and all known or later-developed equivalent structures, materials or acts for performing the claimed function.

DESCRIPTION OF THE PREFERRED EMBODIMENT

Figure 4:
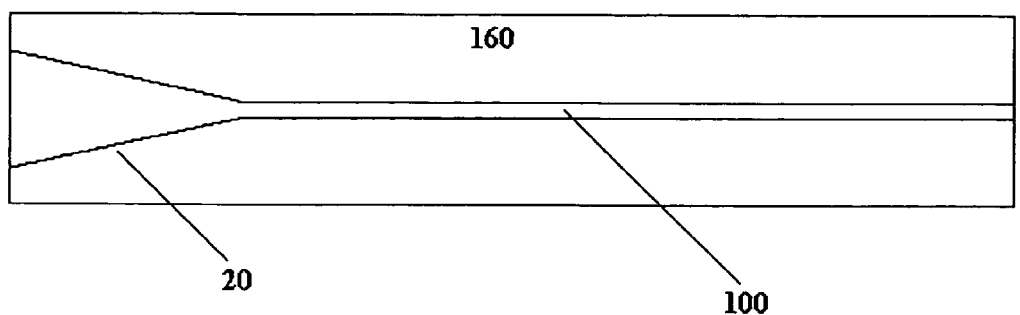
FIG. 4 is a side view in partial section of a prior art ferrule.
Figure 5:
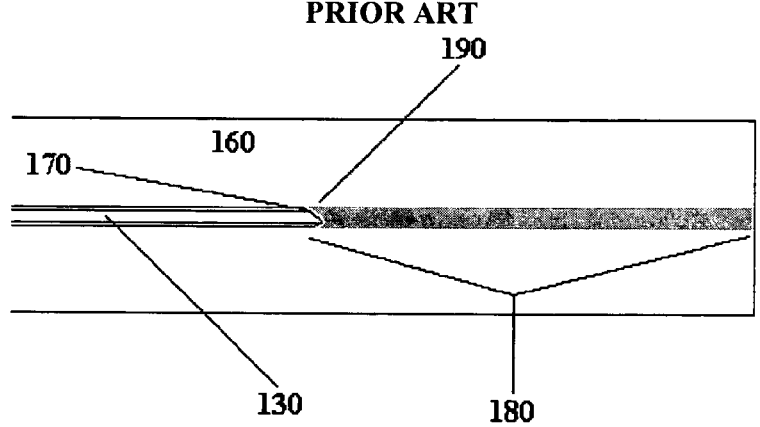
FIG. 5 is a side view in partial section of a prior art termination.

FIG. 4 comprises a view in section of the prior art ferrule 160, equipped with a standard insertion cone 20 to aid entry of delicate, bare fiber, which may or may not employ a preferentially softenable material within bore 110. A hermetic (fused) fiber-in-ferrule termination of prior art is illustrated in FIG. 5, comprising a view in partial section through the fused portion 180, illustrating the asymmetry 190 of the generally lengthy fusion with low contact angle 170 between the fiber 130 and ferrule 160.

Figure 1:
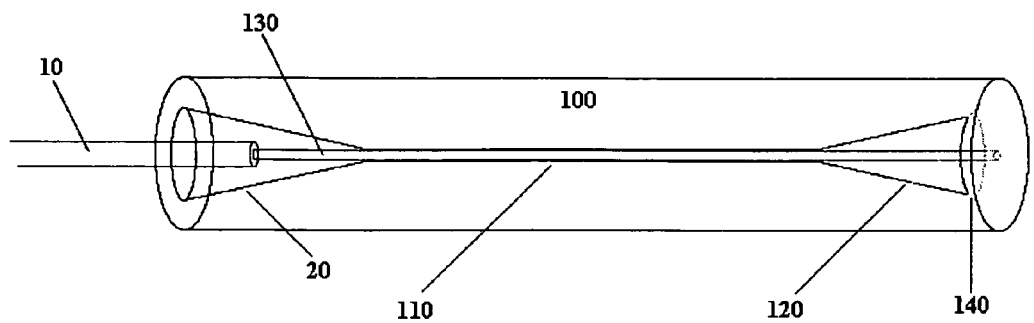
FIG. 1 is a perspective diagram of the fiber-in-ferrule for the present invention.
Figure 2:
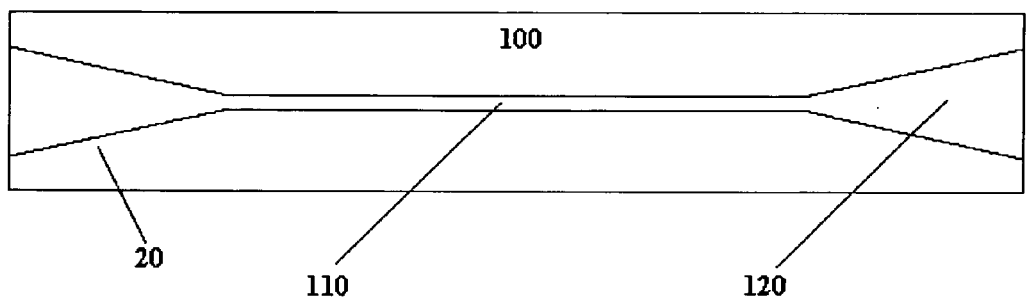
FIG. 2 is a side view in section taken generally along the centerline of FIG. 1.
Figure 3:
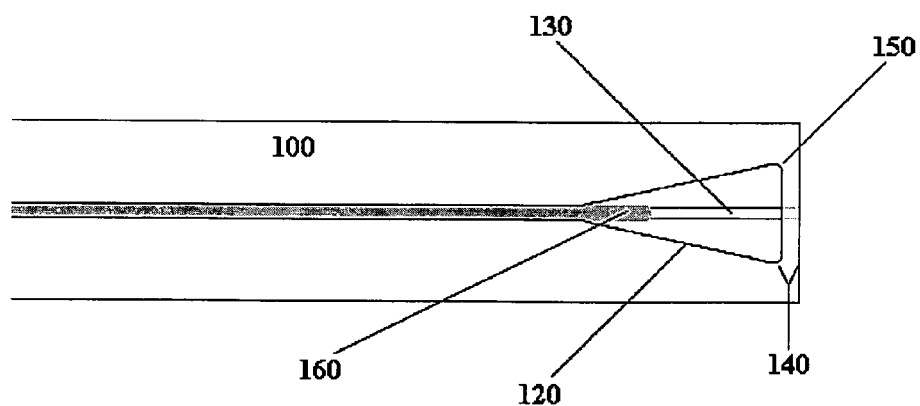
FIG. 3 is a side view in partial section of a terminated fiber element within the ferrule illustrating a variation for polymer clad silica fiber.

The preferred embodiment is illustrated in FIG. 1, comprising a perspective view of a fused, low stress termination of a buffered optical fiber 10. FIG. 2 is a side view in partial section of a ferrule 100 that is a subject of this invention, illustrating the novel flare 120 in the bore 110. FIG. 3 is a view in partial section of the fusion portion of the terminated fiber-in-ferrule illustrating the relatively short, centrosymmetric fused portion 140 and high contact angle 150 between the fiber 130 and ferrule 100 and a cone depth sufficient to permit retention of polymer cladding 160 within all portions of the assembly where close contact between ferrule glass and fiber are possible (except at the fusion itself).

There are several methods available for producing a ferrule according to the present invention. In one embodiment, a glass tube bore may be expanded outward by preferential etching with acid. In another embodiment, a glass tube may be expanded outward by localized ablation using focused laser energy. In a further embodiment, a glass tube may be expanded outwardly by physically expanding the bore of a heated portion of the tube, e.g., with a graphite rod. In a further embodiment, a glass tube may be expanded outwardly through application of a pressure differential within the bore while heating.

In application of the ferrule to hermetic terminations and devices, a filament, such as an optical fiber or capillary may be sealed within the ferrule, at one or both ends, through softening of the conical wall to collapse the material inward, forming a seal between the filament 130 and the ferrule 100. In another embodiment, additional material may be added to the conical space between the filament 130 and ferrule 100 to be softened and flowed to form a seal between the filament and ferrule. In variations of these embodiments, the added material may be preferentially softenable by nature of lower melting temperature, relative to the ferrule, filament or both or may absorb incident radiation more strongly that the ferrule, filament or both.

Figure 6:
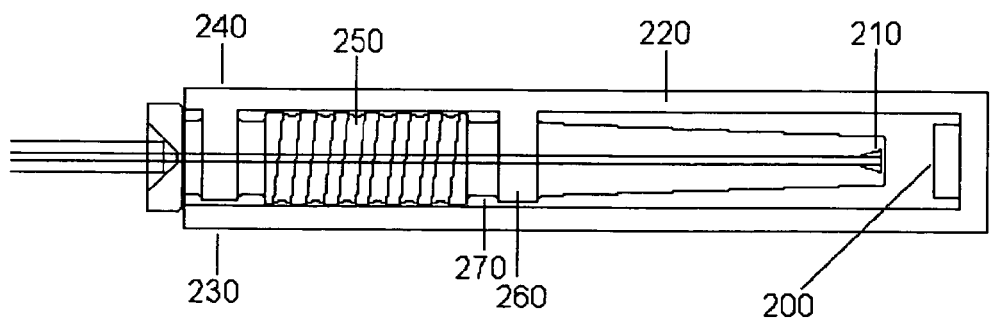
FIG. 6 is a side view in partial section of an extension of the principles described for alternative applications.

Additional embodiments utilizing ferrules with multiple bores and alternative geometries are envisioned, as are extensions of the above description to alternative applications and problems, some of which are illustrated in the remaining figures. FIG. 6 describes a potential light reflection based sensor wherein a reflector 200 is positioned opposite a single mode optical fiber that is carried within a ferrule 210. The fiber-in-ferrule assembly—a obvious application of the art describer herein—and reflector are coupled and hermetically sealed within a carrier tube 220 by art based upon similar principles to the fiber-in-ferrule seal. The ferrule is machined in a fashion that retains tight dimensional tolerances required for maintenance of parallel planes for the fiber and reflector faces but permits trapped atmosphere to escape before seals are made and provides for high contact angles to result from the fusion process. One side of the figure depicts the ferrule geometry prior to fusion 230 and the other depicts the resulting weld geometry after fusion 240. The screw thread 250 serves to maintain the dimensional integrity of the ferrule outer diameter while permitting free passage for trapped air to escape during expansion due to the heat of forming the fusion seals. Machined wells 260 about weld pads 270 force 90° seal angles similar to those in the preferred embodiment. The device is intended to function at extreme pressures and elevated temperature, as found in deep well holes and, as such, the fusion junctions must be exceptionally reliable and alternative preparations can provide similar results.

Figure 7:
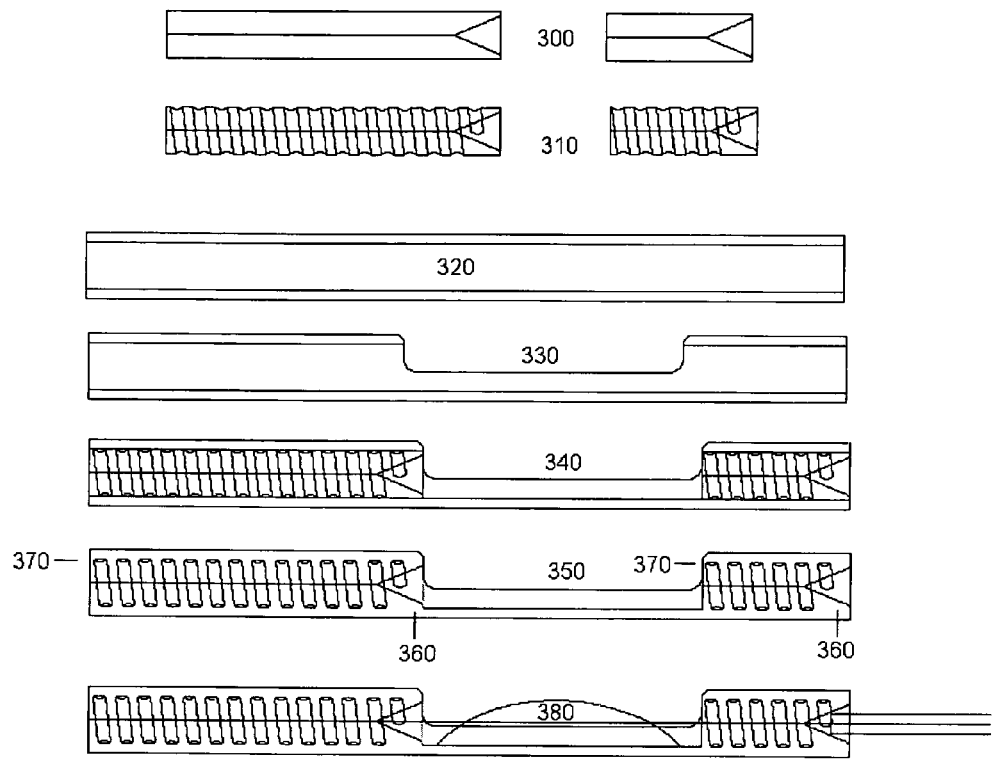
FIG. 7 is a side view in partial section of the assembly steps for making a "gap ferrule" for an evanescence sensing application employing an embodiment of the new art.

FIG. 7G depicts another potential application of the reduced stress fusion technology that is a subject of this disclosure—an evanescent field sensor—and the entire set, FIGS. 7A to 7F illustrates the steps of assembly for ease of visualization of the art. Standard microcapillary ferrules 300 (FIG. 7A), in this case silica, are laser (or otherwise) scribed with a helical pattern 310 (FIG. 7B). A cross tube 320 (FIG. 7C) (also silica) with bore dimensions closely matching the outer diameter of the ferrules 300 is notched 330 with a laser (or other means) (FIG. 7D). The patterned ferrules 310 are inserted into the notched cross tube 340 (FIG. 7E) and fused where the remaining portions of the original outer diameter come into close contact with the cross tube 370 while hermeticity is accomplished at points where the thread pattern is absent 360 (FIG. 7F). In the case of an evanescent field sensor, a sensing compound 380 is applied after the bare fiber is inserted and fixed into position (FIG. 7G). The helical weld about the ferrules presents minimal stress to the assembly, as the contact angles at the weld to air gap are very high with respect to a fusion of two cylinders. Lower temperatures may be used to achieve the weld since air that would otherwise be trapped between the ferrule and cross tube wall easily escapes as the fusion progresses. It should be apparent to those skilled in the art that this type of assembly may have application wherever an exposed section of bare fiber has utility.

Figure 8:
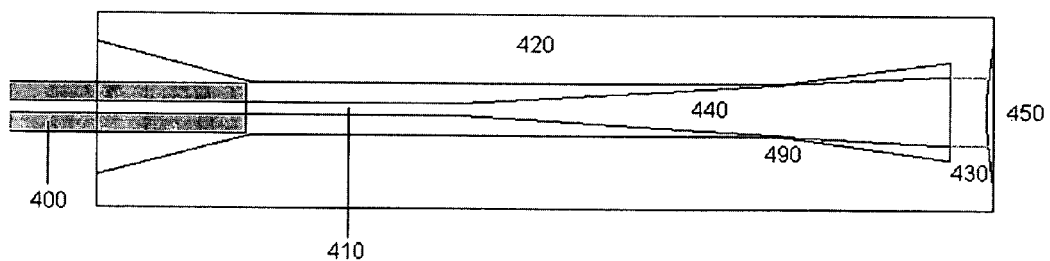
FIG. 8 is a side view in partial section of an additional feature for the preferred embodiment—a concave lens surface on the face of a tapered fiber according to the new art.

FIG. 8 depicts an alternative surgical fiber terminating ferrule 420 utilizing the new art wherein a taper 440 on the original fiber diameter 410 is used to optimize physical and optical properties of the fiber acceptance with the laser focus. The hermetic fusion section 430 is altered by a negative (concave) lens surface 450 in this depiction but no lens or alternative lens curvatures are possible for different applications.

Figure 9:
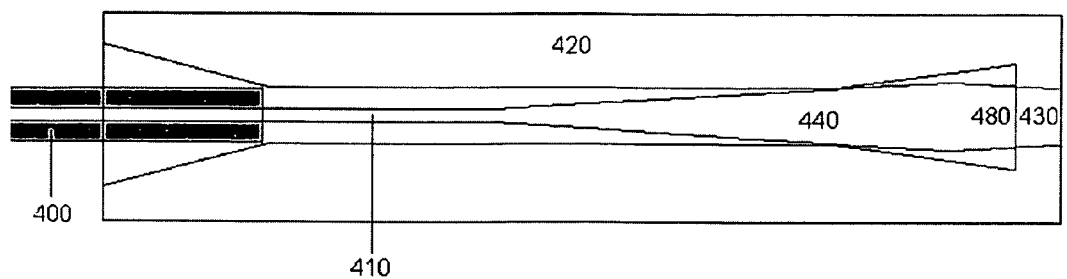
FIG. 9 is a side view in partial section of an additional feature for the preferred embodiment—a feature coined the "Mamma Cass Collimator".

An additional possible feature for collimating incoming light is depicted in FIG. 9 where the taper 440 is permitted to stretch in the ferrule 420 cone section 480 through the fusion region 430 forming an inverse of Mae West collimator fiber geometry that has been coined the "Mamma Cass" collimator. Such a feature is easily accomplished with high repeatability using laser fusion but may also be possible with alternative fusion schemes and may be formed on straight, rather than tapered fiber where desired.

Figure 10:
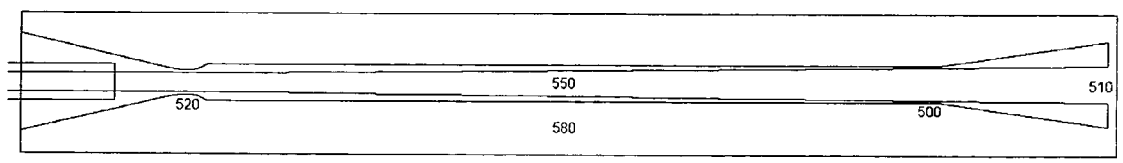
FIG. 10 is a side view in partial section of an additional feature for the preferred embodiment—a restriction at the rear opening of the ferrule for additional centering of tapers in ferrules.

FIG. 10 illustrates an additional option that is useful for the preferred embodiment where tapered fibers are hermetically fused within the ferrule 580. In prior art (Griffin) a crimp ferrule is attached to the rear of the silica ferrule and crimped about the fiber buffer to help center the overall fiber within the ferrule at a point quite distant from the point of fusion (the sole other centering point). While great improvement in alignment is achieved with the prior art strategy, some variation in alignment continues to exist primarily due to asymmetric crimping and centricity errors in the ferrule bore to crimp bore alignment, particularly with tapered fiber applications where the fiber diameter at the rear of the ferrule is significantly smaller than the ferrule bore and where crimps are impractical to employ. The new art offers an additional point of centering at the bottom of the cone at the fusion end 500, but this point is only slightly removed form the point of fusion 510 and, as such angular error potential remains high (particularly in that the fusion itself is not a mechanism for centering but forms about the fiber regardless of its initial position). By slightly defocusing the laser while forming the rear cone (aids fiber insertion and redirects laser energy transmitted by the ferrule rather than the fiber—(see Griffin prior art) a restriction is formed at the bottom of the cone 520 that limits the degree to which the fiber can be off-center at that point. Combined with the contact centering at 500, two-point centering is afforded prior to crimping or in the absence of a crimp and improved axial alignment of the taper 550 within the ferrule 580 is achieved. Small errors in this alignment result in large problems in surgery, particularly where small diameter fibers, tapered to couple to lasers, are tightly bent while delivering power to the target tissues, so this seemingly minor improvement actually has major affect on patient safety and reduced incidence of damage to costly endoscopic equipment.

The preferred embodiment of the invention is described above in the Description of Preferred Embodiments. While these descriptions directly describe the above embodiments, it is understood that those skilled in the art may conceive modifications and/or variations to the specific embodiments shown and described herein. Any such modifications or variations that fall within the purview of this description are intended to be included therein as well. Unless specifically noted, it is the intention of the inventors that the words and phrases in the specification and claims be given the ordinary and accustomed meanings to those of ordinary skill in the applicable art(s). The foregoing description of a preferred embodiment and best mode of the invention known to the applicant at the time of filing the application has been presented and is intended for the purposes of illustration and description. It is not intended to be exhaustive or to limit the invention to the precise form disclosed, and many modifications and variations are possible in the light of the above teachings. The embodiment was chosen and described in order to best explain the principles of the invention and its practical application and to enable others skilled in the art to best utilize the invention in various embodiments and with various modifications as are suited to the particular use contemplated.

What is claimed is:

1. A ferrule and filament assembly comprising a body with a proximal end and a distal end and having an interior channel that extends between the proximal and distal ends, said distal end of the interior channel being expanded in diameter relative to the diameter of a non-distal portion of the interior channel, a filament contained within the interior channel and terminating at the distal end of the ferrule body, and a contacting section in distal end of the ferrule body that bridges between the filament and the distal end of the ferrule.

2. The ferrule and filament assembly as in claim 1, wherein the filament is an optical fiber or a capillary.

3. The ferrule and filament assembly as in claim 1, wherein the contacting section is created by addition of further material within the space between the filament and ferrule.

4. The ferrule and filament assembly as in claim 3 where the added further material is similar to that of the filament.

5. The ferrule and filament assembly as in claim 4, wherein the added further material is a doped material selected from the group consisting of fused quartz, silica and borosilicate glass.

6. The ferrule and filament assembly as in claim 3 where the added further material is similar to that of the ferrule.

7. The ferrule and filament assembly as in claim 6, wherein the added further material is a doped material selected from the group consisting of fused quartz, silica and borosilicate glass.

8. The ferrule and filament assembly as in claim 3 where the source of the added further material is the ferrule.

9. The ferrule and filament assembly as in claim 8, wherein the added further material is a doped material selected from the group consisting of fused quartz, silica and borosilicate glass.

10. The ferrule and filament assembly as in claim 3 where the added further material added is similar to both the filament and ferrule.

11. The ferrule and filament assembly as in claim 10, wherein the added further material is a doped material selected from the group consisting of a commercially available sealing glass, germanium, boron, phosphorous, fluorine and combinations thereof.

12. A fiber Bragg grating device comprising a fiber including a Bragg grating fused within a ferrule and filament assembly as in claim 10.

13. The ferrule and filament assembly as in claim 3 wherein the added further material added is preferentially softenable and has a softening temperature lower than the filament's softening temperature.

14. The ferrule and filament assembly as in claim 13, wherein the added further material is a doped material selected from the group consisting of a commercially available sealing glass, germanium, boron, phosphorous, fluorine and combinations thereof.

15. The ferrule and filament assembly as in claim 3 wherein the added further material is preferentially softenable having a softening temperature lower than the ferrule's softening temperature.

16. The ferrule and filament assembly as in claim 15, wherein the added further material is a doped material selected from the group consisting of a commercially available sealing glass, germanium, boron, phosphorous, fluorine and combinations thereof.

17. The ferrule and filament assembly as in claim 3 wherein the added further material is preferentially softenable having a softening temperature lower than the filament's and ferrule's softening temperatures.

18. The ferrule and filament assembly as in claim 17, wherein the added further material is a doped material selected from the group consisting of a commercially available sealing glass, germanium, boron, phosphorous, fluorine and combinations thereof.

19. A fiber Bragg grating device comprising a fiber including a Bragg grating fused within a ferrule and filament assembly as in claim 17.

20. The ferrule and filament assembly as in claim 3 wherein the added further material is preferentially softenable having an increased absorption of incident radiation relative to the filament.

21. The ferrule and filament assembly as in claim 20, wherein the added further material is a doped material selected from the group consisting of a commercially available sealing glass, germanium, boron, phosphorous, fluorine and combinations thereof.

22. The ferrule and filament assembly as in claim 3 wherein the added further material is preferentially softenable having an increased absorption of incident radiation relative to the ferrule.

23. The ferrule and filament assembly as in claim 22, wherein the added further material is a doped material selected from the group consisting of a commercially available sealing glass, germanium, boron, phosphorous, fluorine and combinations thereof.

24. The ferrule and filament assembly as in claim 3 wherein the added further material is preferentially softenable having an increased absorption of incident radiation relative to the filament and ferrule.

25. A fiber Bragg grating device comprising a fiber including a Bragg grating fused within a ferrule and filament assembly as in claim 3.

* * * * *